US006375876B1

(12) United States Patent
Kessler et al.

(10) Patent No.: US 6,375,876 B1
(45) Date of Patent: Apr. 23, 2002

(54) METHOD FOR PRODUCING AN INTEGRALLY ASYMMETRICAL POLYOLEFIN MEMBRANE

(75) Inventors: Erich Kessler, Höchst i. Odw.; Thomas Batzilla, Bürgstadt; Friedbert Wechs, Wörth; Frank Wiese, Wuppertal, all of (DE)

(73) Assignee: Membrana GmbH, Wuppertal (DE)

( * ) Notice: Subject to any disclaimer, the term of this patent is extended or adjusted under 35 U.S.C. 154(b) by 0 days.

(21) Appl. No.: 09/869,153

(22) PCT Filed: Jan. 19, 2000

(86) PCT No.: PCT/EP00/00391

§ 371 Date: Sep. 4, 2001

§ 102(e) Date: Sep. 4, 2001

(87) PCT Pub. No.: WO00/43113

PCT Pub. Date: Jul. 27, 2000

(30) Foreign Application Priority Data

Jan. 22, 1999 (DE) .......................... 199 02 566

(51) Int. Cl.⁷ .................... B29C 65/00; B01D 39/00; C08J 9/28
(52) U.S. Cl. ................... 264/41; 210/500.36; 521/64
(58) Field of Search ................ 264/41; 210/500.36; 521/64

(56) References Cited

U.S. PATENT DOCUMENTS

| | | | |
|---|---|---|---|
| 4,237,831 A | * 12/1980 | Young et al. | 264/41 |
| 4,247,498 A | * 1/1981 | Castro | 264/41 |
| 4,594,207 A | * 6/1986 | Joseflack et al. | 264/41 |
| 4,666,607 A | * 5/1987 | JJoseflack et al. | 210/640 |
| 4,980,101 A | * 12/1990 | Beck et al. | 264/41 |
| 5,155,144 A | * 10/1992 | Mangamaro et al. | 523/134 |
| 5,962,544 A | * 10/1999 | Walker, Jr. | 521/141 |

FOREIGN PATENT DOCUMENTS

| | | |
|---|---|---|
| DE | 2833493 | 1/1980 |
| DE | 3205289 | 8/1983 |
| EP | 0285812 | 10/1988 |
| EP | 0299381 | 1/1989 |
| WO | 99/04891 | 2/1999 |

OTHER PUBLICATIONS

Robert E. Kesting, "Synthetic Polymeric Membranes", Second Edition, pgs. 261–264.

C.A. Smolders et al., "Liquid–liquid Phase Separation in Concentrated Solutions of Non–Crystallizable Polymers by Spinodal Decomposition", Kolloid–Z.u.Z. Polymers 243: pgs. 14–20, 1971.

Robert E. Kesting, "Synetheic Polymeric Membranes", Second Edition, pp. 261–264.

C.A. Smolders et al., "Liquid–liquid Phase Seperation in Concentrated Solutions of Non–Crystallizable Polymers by Spinodal Decomposition", Kolloid–Z.u.Z. Polymere 243: pp. 14–20, 1971.

* cited by examiner

*Primary Examiner*—Morton Foelak
(74) *Attorney, Agent, or Firm*—Oliff & Berridge, PLC

(57) ABSTRACT

Process for producing an integrally asymmetrical hydrophobic polyolefinic membrane with a sponge-like, open-pored, microporous support structure and a separation layer with a denser structure compared to the support structure, via a thermally induced liquid-liquid phase separation process. A solution of at least one polyolefin in a solvent system consisting of a compound A and a compound B is extruded to form a shaped object. Compound A is a weak solvent and compound B a non-solvent for the polymer. After leaving the die, the shaped object is cooled using a solid or liquid cooling medium that does not dissolve or react chemically with the polymer at temperatures up to the die temperature, until the phase separation and solidification of the high-polymer-content phase take place.

23 Claims, 5 Drawing Sheets

METHOD FOR PRODUCING AN INTEGRALLY ASYMMETRICAL POLYOLEFIN MEMBRANE

BACKGROUND OF THE INVENTION

1. Field of the Invention

The invention relates to a process for producing a hydrophobic membrane using a thermally induced phase separation process, the membrane having a sponge-like, open-pored, microporous structure, and to the use of the membrane for gas exchange processes, in particular for oxygenation of blood.

2. Description of the Related Art

The invention relates to a process for producing a hydrophobic membrane using a thermally induced phase separation process in accordance with the preamble of Claim 1, the membrane having a sponge-like, open-pored, microporous structure, and to the use of the membrane for gas exchange processes, in particular for oxygenation of blood.

In a multitude of applications in the fields of chemistry, biochemistry, or medicine, the problem arises of separating gaseous components from liquids or adding such components to the liquids. For such gas exchange processes, there is increasing use of membranes that serve as a separation membrane between the respective liquid, from which a gaseous component is to be separated or to which a gaseous component is to be added, and a fluid that serves to absorb or release this gaseous component. The fluid in this case can be either a gas or a liquid containing the gas component to be exchanged or capable of absorbing it. Using such membranes, a large exchange surface can be provided for gas exchange and, if required, direct contact between the liquid and fluid can be avoided.

An important application of membrane-based gas exchange processes in the medical field is for oxygenators, also called artificial lungs. In these oxygenators, which are used in open-heart operations, for example, oxygenation of blood and removal of carbon dioxide from the blood take place. Generally, bundles of hollow-fiber membranes are used for such oxygenators. Venous blood flows in this case in the exterior space around the hollow-fiber membranes, while air, oxygen-enriched air, or even pure oxygen, i.e., a gas, is passed through the lumen of the hollow-fiber membranes. Via the membranes, there is contact between the blood and the gas, enabling transport of oxygen into the blood and simultaneously transport of carbon dioxide from the blood into the gas.

In order to provide the blood with sufficient oxygen and at the same time to remove carbon dioxide from the blood to a sufficient extent, the membranes must ensure a high degree of gas transport: a sufficient amount of oxygen must be transferred from the gas side of the membrane to the blood side and, conversely, a sufficient amount of carbon dioxide from the blood side of the membrane to the gas side, i.e., the gas flow or gas transfer rates, expressed as the gas volume transported per unit of time and membrane surface area from one membrane side to the other, must be high. A decisive influence on the transfer rates is exerted by the porosity of the membrane, since only in the case of sufficiently high porosity can adequate transfer rates be attained.

A number of oxygenators are in use that contain hollow-fiber membranes with open-pored, microporous structure. One way to produce this type of membrane for gas exchange, such as for oxygenation, is described in DE-A-28 33 493. Using the process in accordance with this specification, membranes can be produced from meltable thermoplastic polymers with up to 90% by volume of interconnected pores. The process is based on a thermally induced phase separation process with liquid-liquid phase separation. In this process, a homogeneous single-phase melt mixture is first prepared from the thermoplastic polymer and a compatible component that forms a binary system with the polymer, the system in the liquid state of aggregation having a range of full miscibility and a range with a miscibility gap, and this melt mixture is then extruded into a bath that is substantially chemically inert with respect to, i.e., does not substantially react chemically with, the polymer and has a temperature lower than the demixing temperature. In this way, a liquid-liquid phase separation is initiated and, on further cooling, the thermoplastic polymer solidified to form the membrane structure.

An improved process for producing such membranes, which permits specific adjustment of the pore volume, size, and wall, is disclosed in DE-A-32 05 289. In this process, 5–90% by weight of a polymer is dissolved, by heating to above the critical demixing temperature, in 10–95% by weight of a solvent system of first and second compounds, which are liquid and miscible with each other at the dissolving temperature, to form a homogeneous solution, whereby the employed mixture of polymer and the cited compounds has a miscibility gap in the liquid state of aggregation below the critical demixing temperature, the first compound is a solvent for the polymer, and the second compound increases the phase separation temperature of a solution consisting of the polymer and the first compound. The solution is given shape and, by cooling in a cooling medium consisting of the first compound or the employed solvent system, is brought to demixing and solidifying of the high-polymer-content phase, and the cited compounds are subsequently extracted.

The membranes disclosed in accordance with DE-A-28 33 493 or DE-A-32 05 289 have an open-pored, microporous structure and also open-pored, microporous surfaces. On the one hand, this has the result that gaseous substances, such as oxygen ($O_2$) or carbon dioxide ($CO_2$), can pass through the membrane relatively unrestricted and the transport of a gas takes place as a Knudsen flow, combined with relatively high transfer rates for gases or high gas flow rates through the membrane. Such membranes with gas flow rates for $CO_2$ exceeding 1 ml/($cm^2$*min*bar) and for $O_2$ at approximately the same level have gas flow rates that are sufficiently high for oxygenation of blood.

On the other hand, however, in extended-duration use of these membranes in blood oxygenation or generally in gas exchange processes with aqueous liquids, blood plasma or a portion of the liquid can penetrate into the membrane and, in the extreme case, exit on the gas side of the membrane, even if in these cases the membranes are produced from hydrophobic polymers, in particular polyolefins. This results in a drastic decrease in gas transfer rates. In the medical area of blood oxygenation, this is termed plasma breakthrough.

The plasma breakthrough time of such membranes, as producible in accordance with DE-A-28 33 493 or DE-A-32 05 289, is sufficient in most cases of conventional blood oxygenation to oxygenate a patient in a normal open-heart operation. However, the desire exists for membranes with higher plasma breakthrough times in order to attain higher levels of safety in extended-duration heart operations and to rule out the possibility of a plasma breakthrough that would require immediate replacement of the oxygenator. The aim, however, is also to be able to oxygenate premature infants or in general patients with temporarily restricted lung function long enough until the lung function is restored, i.e., to be able to conduct extended-duration oxygenation. A prerequisite for this is appropriately long plasma breakthrough times. A frequently demanded minimum value for the plasma breakthrough time in this connection is 20 hours.

From EP-A-299 381, hollow-fiber membranes for oxygenation are known that have plasma breakthrough times of more than 20 hours, i.e., there is no plasma break-through even under extended use. With the otherwise porous membrane with a cellular structure, this is attained by a barrier layer that has an average thickness, calculated from the oxygen and nitrogen flow, not exceeding 2 μm and is substantially impermeable to ethanol. The membrane is substantially free of open pores, i.e., pores that are open both to the outside and to the inside of the hollow-fiber membrane. According to the disclosed examples, the membranes in accordance with EP-A-299 381 have a porosity of at most 31% by volume, since at higher porosity values the pores are interconnected and communication occurs between the sides of the hollow-fiber membranes, resulting in plasma breakthrough. In the barrier layer, the transport of gases to be exchanged occurs by solution diffusion.

The production of these membranes is conducted via a melt-drawing process, i.e., the polymer is first melt-extruded to form a hollow fiber and then hot- and cold-drawn. In this case, only relatively low porosity values are obtained, which means that, in conjunction with the transport occurring in the barrier layer via solution diffusion, the attainable transfer rates for oxygen and carbon dioxide remain relatively low. Moreover, while the hollow-fiber membranes in accordance with EP-A-299 381 exhibit sufficient tensile strength as a result of the pronounced drawing in conjunction with manufacture, they have only a small elongation at break. In subsequent textile processing steps, such as producing hollow-fiber mats, which have proven excellent in the production of oxygenators with good exchange capacity and as are described in EP-A-285 812, for example, these hollow-fiber membranes are therefore difficult to process.

Typically, in melt-drawing processes, membranes are formed with slit-shaped pores with pronounced anisotropy, the first main extension of which is perpendicular to the drawing direction and the second main extension perpendicular to the membrane surface, i.e., in the case of hollow-fiber membranes runs between the exterior and interior surfaces of the membrane, so that the channels formed by the pores run in a relatively straight line between the surfaces. In the case in which, for example, mechanical damage in the spinning process causes leaks in the barrier layer, a preferred direction then exists for the flow of a liquid between the interior and exterior surfaces or vice-versa, thereby promoting plasma breakthrough.

SUMMARY OF THE INVENTION

It is therefore an object of the invention to provide a process with a wide variety of applications and with which integrally asymmetrical membranes with a microporous support structure and a separation layer with a denser structure can be produced that are suited for gas exchange and that exhibit at least to a reduced extent the disadvantages of the prior art membranes, permit high gas exchange capacity, are impervious at least over extended periods of time to a breakthrough of hydrophilic liquids, in particular blood plasma, i.e., are suited in particular to extended-duration oxygenation, and have good qualities for further processing.

The object is met by a process for producing an integrally asymmetrical hydrophobic membrane having a sponge-like, open-pored, microporous support structure and a separation layer with a denser structure compared to the support structure, the process comprising at least the steps of:

a) preparing a homogeneous solution of 20–90% by weight of a polymer component consisting of at least one polymer, selected from the group of polyolefins, in 80–10% by weight of a solvent system containing a compound A and a compound B that are liquid and miscible with each other at the dissolving temperature, whereby the employed mixture of the polymer component and compounds A and B has a critical demixing temperature and a solidification temperature and has a miscibility gap in the liquid state of aggregation below the critical demixing temperature, whereby a solvent for the polymer component is selected for compound A, and compound B raises the demixing temperature of a solution consisting of the polymer component and compound A, b) rendering the solution to form a shaped object, with first and second surfaces, in a die having a temperature above the critical demixing temperature, c) cooling of the shaped object using a cooling medium, tempered to a cooling temperature below the solidification temperature, at such a rate that a thermodynamic non-equilibrium liquid-liquid phase separation into a high-polymer-content phase and a low-polymer content phase takes place and solidification of the high-polymer-content phase subsequently occurs when the temperature falls below the solidification temperature, d) possibly removing compounds A and B from the shaped object, characterized in that a weak solvent for the polymer component is selected for compound A, for which the demixing temperature of a solution of 25% by weight of the polymer component in this solvent is less than 10% below the melting point of the pure polymer component, that a non-solvent for the polymer component is selected for compound B that does not dissolve the polymer component to form a homogeneous solution when heated to the boiling point of the non-solvent, and that, for cooling, the shaped object is brought into contact with a solid or liquid cooling medium that does not dissolve or react chemically with the polymer component at temperatures up to the die temperature.

Surprisingly, it has been shown that, by adhering to these process conditions, integrally asymmetrical membranes are obtained in which at least one surface is formed as a separation layer, which has a denser structure compared to the support layer structure and covers the adjacent sponge-like, open-pored, microporous support layer structure. The process according to the invention allows the realization of separation layers with very thin layer thickness, whose structure can be adjusted from a dense structure up to a nanoporous structure with pores with an average size of less than 100 nm and in individual cases beyond that. At the same time, the support layer of the membranes produced in this manner has a high volume porosity.

BRIEF DESCRIPTION OF THE DRAWINGS

The invention will now be described in more detail with reference to the following examples and figures.

DETAILED DESCRIPTION OF PREFERRED EMBODIMENTS

Figures 1, 2, 3:
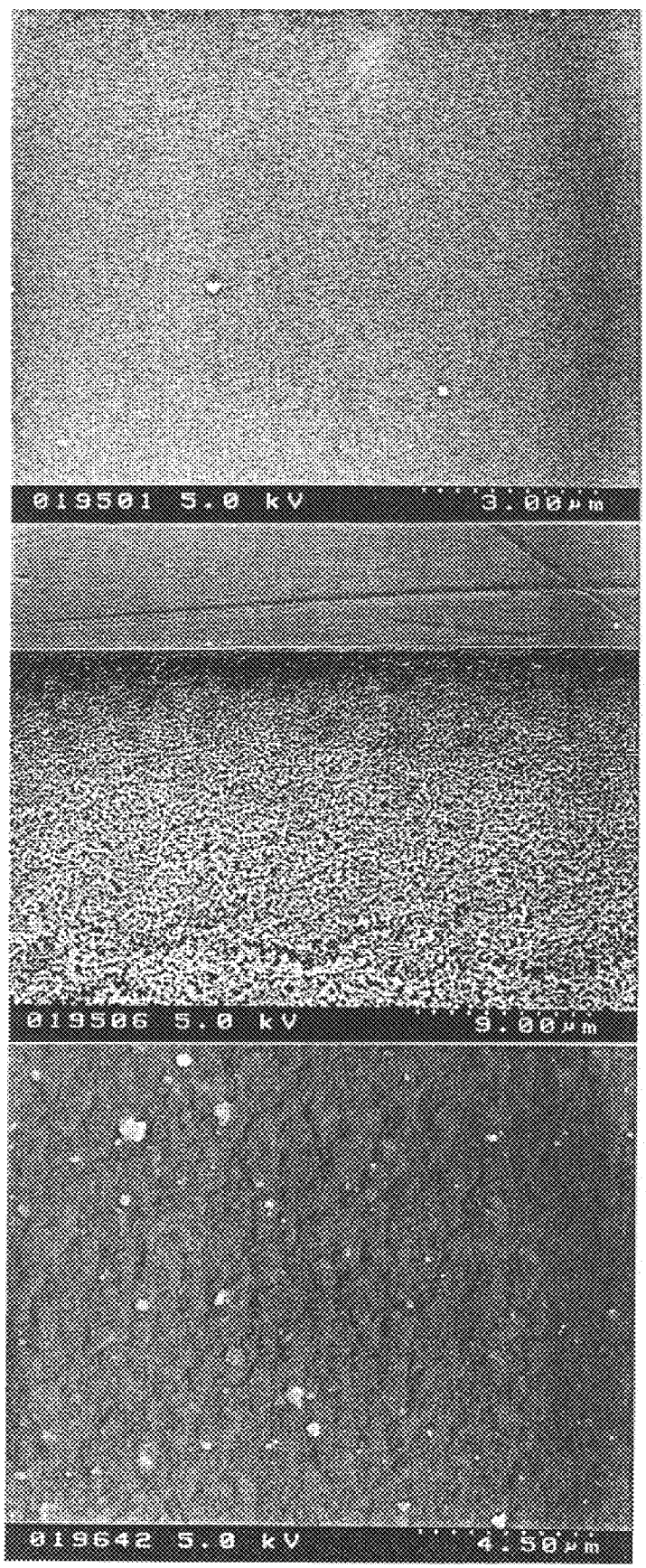
FIG. 1 shows a scanning electron microscope (SEM) image of a membrane according to example 1 at 9000× magnification; membrane surface that was facing the glass side during membrane production.
FIG. 2 shows an SEM image of a membrane according to example 1 at 3000×magnification; fracture edge of the membrane between the membrane wall and the surface that was facing the glass side during membrane production.
FIG. 3 shows an SEM image of the exterior surface of a hollow-fiber membrane according to example 2 at 6000× magnification.

Preferably, using the process according to the invention, integrally asymmetrical membranes are produced with a dense separation layer. In the context of the present invention, a dense structure is understood to be one for which no pores are evident based on an examination by scanning electron microscope at 60000×magnification.

The process according to the invention thus permits the production of integrally asymmetrical membranes with a separation layer that is impervious over long periods of time to liquid breakthrough but at the same time gas permeable, and with a support layer with high volume porosity, resulting at the same time in high gas transfer capacity for these membranes in gas transfer processes. These membranes find excellent application for extended-duration blood oxygenation, whereby the separation layer of these membranes is responsible for making them impervious over extended periods of time to the breakthrough of blood plasma.

Within the context of the present invention, an integrally asymmetrical membrane is understood to be one in which the separation and support layers consist of the same material and have been formed together directly during membrane production and both layers are integrally joined with each other as a result. In the transition from the separation layer to the support layer, there is merely a change with respect to the membrane structure. Contrasting with this are composite membranes, for example, which have a multilayer structure formed by applying, in a separate process step, a dense layer as a separation layer on a porous, often microporous support layer or support membrane. The result is that the materials constituting the support and separation layers also have different properties in the case of composite membranes.

The process according to the invention is based on a thermally induced phase separation process with liquid-liquid phase separation. According to the invention, the polymer component and compounds A and B form a binary system, which in the liquid state of aggregation has a range in which the system is present as a homogeneous solution and a range in which it exhibits a miscibility gap. If such a system is cooled, from the range in which it is present as a homogenous solution, below the critical demixing or phase separation temperature, liquid-liquid demixing or phase separation into two liquid phases, namely one with a high polymer content and the other with a low polymer content, initially takes place. On further cooling, below the solidification temperature, the high-polymer-content phase solidifies to form a three-dimensional membrane structure. The cooling rate in this case has a substantial influence on the pore structure being created. If the cooling rate is high enough that the liquid-liquid phase separation cannot take place under thermodynamic equilibrium conditions but rather under thermodynamic non-equilibrium conditions and on the other hand still relatively slowly, the liquid-liquid phase separation occurs approximately concurrently with the formation of a large number of droplets of liquid that are of substantially the same size. The resulting polymer object then has a sponge-like cellular and open-pored microstructure. If the cooling rate is significantly higher, the polymer solidifies before most of the droplets of liquid can form. In this case, network-like microstructures are formed. The variety of such sponge-like microporous structures formed via processes with thermally induced liquid-liquid phase separation are described in detail in DE-A-27 37 745, to the disclosure of which reference is hereby explicitly made, and depicted for example in R. E. Kesting, "Synthetic Polymeric Membranes", John Wiley & Sons, 1985, pp. 261–264.

The employed combinations of the polymer component, compound A, and compound B, whereby compounds A and B together form the solvent system, must be convertible jointly into a single homogeneous liquid phase and have a critical demixing temperature below which a phase separation into two liquid phases occurs. In the weak solvents used as compound A according to the invention, the polymer component/compound A systems exhibit a miscibility gap in the liquid state of aggregation and related thereto a critical demixing temperature. The use of compound B increases this critical demixing temperature, whereby solutions with equal parts of polymer are considered. Adding compound B enables selective control of pore size and volume in the porous structures obtained.

For compound A, compounds are to be used that are solvents for the polymer component and in which, when heated at most to the boiling point of this compound, the polymer component is dissolved completely to form a homogeneous solution. According to the invention, a solvent must be used as compound A for which the demixing temperature of a solution of 25% by weight of the polymer component in this solvent is less than 10% under the melting point of the pure polymer component. Within the scope of the present invention, such a solvent is referred to as a weak solvent. In contrast, a strong solvent within the scope of the invention is one for which the demixing temperature of a solution of 25% by weight of the polymer component in this solvent is at least 14% below the melting point of the pure polymer component.

The demixing or phase separation temperature in this case can be determined in a simple manner by initially preparing a homogeneous solution of the polymer component in the solvent to be investigated and then heating this solution to a temperature approximately 20° C. above the dissolving temperature. This solution is stirred and maintained at this temperature for about 0.5 hours, in order to achieve sufficient homogeneity. Subsequently, the solution is stirred and cooled at a rate of 1° C./min. The phase separation temperature is determined as the temperature at which clouding becomes visible. On further cooling, the phase with high polymer content solidifies at the solidification temperature.

For compound B, according to the invention a compound is selected that is a non-solvent for the polymer component. A non-solvent for the polymer component is understood to mean a compound B that does not dissolve the polymer component, in a concentration of 1% by weight in the non-solvent, to form a homogeneous solution when heated at most to the boiling point of the non-solvent.

Compound A can also be blended with one or more liquids, in particular other solvents. Compound B can also be employed as a mixture with one or more other compounds, in particular other non-solvents. As a result, within the context of the present invention, compound A is understood to be not only a single compound but also a mixture of different solvents, for example two weak solvents or a weak solvent with a fraction of a stronger solvent, as long as the overall action as a weak solvent is maintained. Likewise, compound B is also understood to be a mixture of different non-solvents.

The formation of the separation layer as well as the degree of its tightness is in part influenced by the compound B employed. In an especially preferred embodiment of the process according to the invention, compound B is a weak non-solvent for the polymer component. In the scope of the present invention, the strength of a non-solvent is assessed on the basis of the difference between the demixing temperature of a system consisting of the polymer component and a strong solvent and the demixing temperature of a corresponding system containing as a solvent system the same solvent and 10% by weight of the non-solvent to be investigated. The polymer concentration in each case is 25% by weight. A weak non-solvent is then understood to be one that leads to an increase in the demixing temperature of at most 8% relative to the demixing temperature of the corresponding system consisting only of the solvent and the polymer component. A strong non-solvent is then one that leads to an at least 10% increase in the demixing temperature.

The fraction of polymer required for membrane production and the ratio of compound A to compound B in the solvent system can be determined by generating phase diagrams in simple experiments. Such phase diagrams can be developed using known methods, such as are described in C. A. Smolders, J. J. van Aartsen, A. Steenbergen, Kolloid-Z. und Z. Polymere, 243 (1971), pp. 14–20. As a rule, for a given solvent A, when using a weak non-solvent as compound B, the fraction of compound B in the mixture of the polymer component, compound A, and compound B must be higher than when using a strong non-solvent as compound B. Preferably, the fraction of compound B in the solvent system is 1 to 45% by weight.

According to the invention, the polymer component used is at least one polymer selected from the group of polyolefins. In this case, the polymer component can be a single polyolefin or a mixture of several polyolefins, whereby the polyolefins also include polyolefin copolymers or modified polyolefins. Mixtures of different polyolefins are interesting in that various properties such as permeability or mechanical characteristics can be optimized thereby. For example, by adding just slight amounts of a polyolefin with an ultrahigh molecular weight, for example exceeding $10^6$ daltons, a strong influence can be exerted on the mechanical properties. A prerequisite for this, of course, is that the polyolefins employed in this case together be soluble in the solvent system used.

In an advantageous embodiment of the process according to the invention, the at least one polymer in the polymer component is at least one polyolefin consisting exclusively of carbon and hydrogen. Especially preferred polyolefins are polyethylene, polypropylene and poly(4-methyl-1-pentene) or mixtures of these polyolefins among themselves or with other polyolefins. Of particular advantage is the use of poly(4-methyl-1-pentene) or a mixture of poly(4-methyl-1-pentene) with polypropylene. High gas transfer rates can be realized thereby, while maintaining good mechanical properties for the membranes.

For compounds A and B, which jointly form the solvent system, compounds are to be used that fulfill the stated conditions. In the case of the preferred use of polyethylene as the polymer component, soybean oil, palm nut oil, isopropyl myristate, or mixtures thereof are preferably used for compound A. Compound B can then advantageously be castor oil. In the preferred use of polypropylene as the polymer component, compound A is preferably N,N-bis(2-hydroxyethyl)tallow amine, dioctyl phthalate, soybean oil, palm nut oil, or mixtures thereof. In this case, diethyl phthalate, glycerin triacetate, castor oil, or mixtures thereof can advantageously be used as compound B. In the preferred use of poly(4-methyl-1-pentene) as the polyolefin, compound A is preferably palm nut oil, dibutyl phthalate, dioctyl phthalate, butyl stearate, or mixtures thereof. Glycerin triacetate, diethyl phthalate, castor oil, N,N-bis(2-hydroxyethyl)tallow amine, soybean oil, glycerin diacetate, glycerin monoacetate, or mixtures thereof have then proven advantageous as compound B. The use of glycerin triacetate as compound B has proven especially advantageous.

The polymer fraction of the mixture from which the solution is formed is preferably 30–60% by weight, and the fraction of the solvent system, consisting of compounds A and B, is 70–40% by weight. The polymer fraction is especially preferred to be 35–50% by weight and the fraction of compounds A and B 65–50% by weight. If necessary, additional substances such as antioxidants, nucleating agents, fillers, components to improve biocompatibility, i.e., blood tolerance when using the membrane in oxygenation, such as vitamin E, and similar substances can be employed as additives to the polymer component, compounds A and B, or to the polymer solution.

The polymer solution formed from the polymer component and the solvent system is given shape using suitable dies to produce a membrane preferably in the form of a flat or hollow-fiber membrane. Conventional dies such as sheeting dies, casting molds, doctor blades, profiled dies, annular-slit dies, or hollow-fiber dies can be employed.

Preferably, hollow-fiber membranes are produced by the process according to the invention. In this case, the polymer solution is extruded through the annular gap of the corresponding hollow-fiber dies to form a shaped object, i.e., a hollow fiber. A fluid is metered through the central bore of the hollow-fiber die that acts as an interior filler that shapes and stabilizes the lumen of the hollow-fiber membrane. The extruded hollow fiber or resulting hollow-fiber membrane then exhibits a surface facing the lumen, the interior surface, and a surface facing away from the lumen, the exte-exterior surface, separated from the interior surface by the wall of the hollow fiber or hollow-fiber membrane.

After shaping, the shaped object is cooled using a solid or liquid cooling medium, so that a thermodynamic non-equilibrium liquid-liquid phase separation occurs in the shaped object, i.e., in the shaped polymer solution, and the polymer structure subsequently solidifies and hardens. In this process, the cooling medium has been tempered to a temperature below the solidification temperature. According to the invention, in order to produce the desired integrally asymmetrical membrane with separation layer, the cooling medium must be one that does not dissolve or react chemically with the polymer component, even when the medium is heated to the die temperature. The use of such a cooling medium is decisive for the formation of a separation layer with a denser structure. Such a requirement placed on the cooling medium rules out, for example, the use as a cooling medium of the mixture of compounds A and B employed as the solvent system. Although such a system would not dissolve the polymer component at the cooling temperature, this mixture with the polymer component forms a homogeneous solution at the die temperature, as previously noted.

In the production of flat membranes, the cooling medium can also be a solid material or a solid surface, for example in the form of a glass or metal plate or an appropriately temperature-controlled or cooled cooling roller, onto which the shaped object is laid. Preferably, the solid cooling medium has a high thermal conductivity and is especially preferred to consist of a metallic material.

In an advantageous embodiment of the process according to the invention, however, a liquid cooling medium is used. It is especially preferred for the liquid used as the cooling medium to be a non-solvent for the polymer component, i.e., it does not dissolve the polymer component to form a homogeneous solution when heated to at most the boiling point of the cooling medium. The liquid used as the cooling medium can also contain a component that is a solvent for the polymer component, or it can also be a mixture of different non-solvents, as long as it overall does not dissolve the polymer component at temperatures up to at least the die temperature. It is observed in this case that the degree of non-solvent character of the cooling medium influences the tightness of the separation layer being formed. In an especially preferred embodiment of the process according to the invention, therefore, a liquid is used as a cooling medium that is a strong non-solvent for the polymer component. Concerning the definitions of non-solvent and strong non-solvent, refer to the previous discussion in conjunction with compound B. Preferably, the cooling medium at the cooling temperature is a homogeneous, single-phase liquid. This ensures production of membranes with especially homogeneous surface structures.

The liquid cooling medium used can be one that is miscible with the solvent system to form a homogeneous solution or one that does not dissolve the compounds forming the solvent system. The liquid cooling medium advantageously contains compound B.

To initiate a thermodynamic non-equilibrium liquid-liquid phase separation, the temperature of the cooling medium must be significantly below the critical demixing temperature or phase separation temperature of the polymer solution used and below the solidification temperature in order to solidify the phase with high polymer content. In this case, the formation of the separation layer is promoted when there is as great a difference as possible between the demixing temperature and the temperature of the cooling medium. The cooling medium preferably has a temperature at least 100° C. below the phase separation temperature, and especially preferably a temperature that is at least 150° C. below the phase separation temperature. It is particularly advantageous if the temperature of the cooling medium in this case is under 50° C. In individual cases, cooling to temperatures below ambient temperature can be required. It is also possible for cooling to take place in several steps.

The liquid cooling medium is preferably in a shaft or spinning tube which the shaped object passes through for cooling purposes. In this case, the cooling medium and shaped object are generally fed in the same direction through the shaft or spinning tube. The shaped object and cooling medium can be fed at the same or different linear speeds through the spinning tube, whereby, depending on the requirement, either the shaped object or the cooling medium can have the higher linear speed. Such process variants are described in DE-A-28 33 493 or EP-A-133 882, for example.

The interior filler employed in extrusion of hollow filaments can be in gaseous or liquid form. When using a liquid as the interior filler, a liquid must be selected that substantially does not dissolve the polymer component in the shaped polymer solution below the critical demixing temperature of the polymer solution. In other respects, the same liquids can be used as can also be used as the cooling medium. In this manner, hollow-fiber membranes can also be produced that have a separation layer on both their outside and inside, or also hollow-fiber membranes that have a separation layer only on the inside. Preferably, the interior filler is then a non-solvent for the polymer component and especially preferably a strong non-solvent for the polymer component. The interior filler in this case can be miscible with the solvent system. In case the interior filler is gaseous, it can be air, a vaporous material, or preferably nitrogen or other inert gases.

It is advantageous if the exit surface of the die and the surface of the cooling medium are spatially separated by a gap, which is transited by the shaped object prior to contact with the cooling medium. The gap can be an air gap, or it can also be filled with another gaseous atmosphere, and it can also be heated or cooled. The polymer solution, however, can also be brought directly into contact with the cooling medium after exiting from the die.

In an advantageous embodiment of the process according to the invention, at least one of the surfaces of the shaped object leaving the die, i.e. the polymer solution leaving the die in a shaped state, preferably the surface on which the separation layer is to be formed, is subjected prior to cooling to a gaseous atmosphere promoting the evaporation of compound A and/or B, i.e., to an atmosphere in which the evaporation of compound A and/or B is possible. Preferably, air is used to form the gaseous atmosphere. Likewise preferred are nitrogen or other inert gases or also vaporous media. The gaseous atmosphere is advantageously conditioned and generally has a temperature below that of the die. To evaporate a sufficient fraction of compound A and/or B, at least one of the surfaces of the shaped object is preferably subjected to the gaseous atmosphere for at least 0.5 ms.

To provide the gaseous atmosphere promoting the evaporation of compound A and/or B, for example when using a liquid cooling medium to cool the shaped object, the die and cooling medium can be spatially separated such that a gap is formed between them that contains the gaseous atmosphere and through which the shaped object passes.

In producing flat membranes, for example, the polymer solution extruded through a sheeting die, for example, can, as a flat sheet, initially be passed through a gap, such as an air gap, before being cooled. In this case, the flat sheet is enveloped on all sides, i.e., the two surfaces and the edges, by the gaseous atmosphere, influencing the formation of a separation layer on both surfaces of the resulting flat membrane. If the extrusion of the flat sheet is performed directly onto a heated carrier, for example in the form of a heating roller, and if the flat sheet on the carrier then passes through a defined zone in a gaseous atmosphere before being cooled by the cooling medium, only one surface of the flat sheet, namely that facing away from the heating roller, comes into contact with the gaseous atmosphere, thus influencing the formation of a separation layer, by evaporation, only on this surface.

In the case of producing hollow-fiber membranes, the hollow filament leaving the die can likewise be directed through a gap formed between the die and cooling medium and containing the gaseous atmosphere.

In individual cases, the structure of the separation layer can also be influenced by drawing the shaped polymer solution after exiting the die, i.e., particularly in the air gap, whereby the drawing is effected by establishing a difference between the exit speed of the polymer solution from the die and the speed of the first withdrawal device for the cooled shaped object.

After cooling and hardening of the polymer structure, compounds A and B are usually removed from the shaped object. Removal can be performed, for example, by extraction. Preferably, extraction agents are used that do not dissolve the polymer or polymers but are miscible with compounds A and B. Subsequent drying at elevated temperatures can be necessary to remove the extraction agent from the membrane. Suitable extraction agents are acetone, methanol, ethanol, and preferably isopropanol.

In some cases, it can also be practical to retain one or both of the two compounds A and B at least in part in the shaped object and to extract only one or neither of the compounds. Other components added to compounds A and/or B as additives can remain in the membrane structure as well and thus serve as functional active liquids, for example. Various examples of microporous polymers containing functional active liquids are described in DE-A 27 37 745.

Before or after the removal of at least a substantial portion of the solvent system, a slight drawing of the membrane can take place in order in particular to modify the properties of the separation layer in a specific manner. For example, in a substantially dense separation layer, drawing can be used to create pores and/or adapt the pore size of the separation layer to the size required by the specific application for the resulting membrane.

In producing membranes for extended-duration oxygenation, however, it must be ensured that the average pore size does not exceed 100 nm, so that premature breakthrough of liquid can be avoided. For this reason, the drawing should generally not exceed 10% when producing the membrane of the invention. The drawing can, as required, also be performed in several directions and is advantageously performed at elevated temperatures. For example, such drawing can also be conducted during drying of the membrane that might be necessary after extraction.

By adjusting the pore size of the separation layer, such as in a downstream drawing step, membranes for nanofiltration or ultrafiltration can therefore also be produced by the process according to the invention.

The process according to the invention is preferably used to produce hydrophobic integrally asymmetrical membranes, in particular for gas separation or gas exchange, whereby the membranes are composed primarily of at least one polymer selected from the group of polyolefins, have first and second surfaces, and have an intermediate support layer with a sponge-like, open-pored, microporous structure and adjacent to this support layer on at least one of the surfaces a separation layer with a denser structure, whereby the pores, if any, in the separation layer have an average diameter<100 nm, the separation layer is free of macrovoids, the pores in the support layer are on average substantially isotropic, and the membrane has a porosity in the range from greater than 30% to less than 75% by volume. For this reason, the invention further relates to such a membrane, which is producible by the process according to the invention. It is especially preferable for the membranes produced by the process according to the invention to have a dense separation layer.

The average pore diameter in the separation layer is understood to be the mean of the diameters of the pores in the surface formed as the separation layer, whereby an image of a scanning electron microscope at 60000×magnification is used as a basis. In the image-analysis evaluation, the pores are assumed to have a circular cross-section. The average pore diameter is the arithmetic mean of all visible pores on a membrane surface of approx. 8 $\mu$m×6 $\mu$m at 60000× magnification. In the membranes produced according to the invention, existing pores in the surface exhibiting the separation layer are uniformly, i.e., homogeneously, distributed over this surface.

Due to their structure, these membranes are distinguished by high gas flow rates and high gas transfer rates while maintaining high levels of safety with respect to a breakthrough of the liquid, from which, when using the membrane of the invention for gas transfer, a gaseous component is to be separated or to which a gaseous component is to be added, and also by good mechanical properties. To achieve this, the membrane has a high volume porosity, whereby the latter is determined substantially by the structure of the support layer, and a defined separation layer with reduced thickness.

The support layer of the membranes produced by the process according to the invention can, as previously discussed, have different structures. In one embodiment, the support layer has a sponge-like, cellular, and open-pored structure, in which the pores can be described as enveloped microcells that are interconnected by channels, smaller pores, or passages. In another embodiment, the support layer has a non-cellular structure, in which the polymer phase and the pores form interpenetrating network structures. In any case, however, the support layer is free of macrovoids, i.e., free of such pores often referred to in the literature as finger pores or caverns.

The pores of the support layer can have any geometry and be, for example, of elongated, cylindrical, rounded shape, or also have a more or less irregular shape. In the membranes preferably produced by the process according to the invention, the pores in the support layer are on average substantially isotropic. This is understood to mean that, although the individual pores can also have an elongated shape, the pores on average in all spatial directions have substantially the same extension, whereby deviations of up to 20% can exist between the extensions in the individual spatial directions.

With an insufficiently low volume porosity, i.e. an insufficient pore fraction compared to the total volume of the membrane, the attainable gas flow and gas transfer rates are too low. On the other hand, an excessive pore fraction in the membrane leads to deficient mechanical properties, and the membrane cannot be readily processed in subsequent processing steps. Using the process according to the invention, preferably membranes can be produced that have a volume porosity in the range of greater than 30% to less than 75% by volume and especially preferably greater than 50% to less than 75% by volume.

The membranes produced in this manner can have a separation layer on only one of their surfaces, or they can have a separation layer on both surfaces. The separation layer influences on the one hand the transfer, or gas flow, rates but on the other hand the breakthrough time, i.e., the time the membranes are protected from a break-through of the liquid from which, when using the membrane, a gaseous component is to be separated or to which a gaseous component is to be added, or from a break-through of components contained in the liquid. With a dense separation layer, very long breakthrough times are the result, but the transfer rates are limited in size, since in dense membrane layers the gas transfer takes place solely via a comparatively slow solution diffusion, in contrast to the considerably greater Knudsen flow in porous structures. In the case of a nanoporous separation layer, on the other hand, the gas transfer rates are higher than those with a dense separation layer, but reduced breakthrough times can result due to the pores.

The separation layer must not be too thin, since this increases the risk of defects and thus of breakthrough. However, the time to actual breakthrough is still relatively long with the membranes produced by the process according to the invention, since in these membranes there is no preferred direction for the flow of a liquid; rather, the course of the liquid is tortuous due to the pore structure. Contrasting with this are membranes produced according to the aforementioned melt-drawing process, in which, due to the pronounced anisotropy of the pores, a preferred direction for the flow of the liquids from one surface to the other results.

While excessively thin separation layers make the risk of defects too great, an excessive separation layer thickness makes the transfer rates or gas flow rates too low. Preferably, therefore, the thickness of the separation layer lies between 0.01 $\mu$m and 5 $\mu$m, especially preferably between 0.1 $\mu$m and 2 $\mu$m. Membranes of the invention with a separation layer thickness between 0.1 $\mu$m and 0.6 $\mu$m are excellently suited.

The thickness of the separation layer for the membranes produced by the process according to the invention can be determined in a simple manner by measuring the layer using fracture images generated by scanning electron microscopy or by ultra-thin-section characterizations using transmission electron microscopy.

The membranes preferably produced by the process according to the invention have, due to the formation of the separation layer in conjunction with the high porosity of the membranes, sufficiently high permeability for use in blood oxygenation and thus attain sufficiently high gas flow rates. For the gas flow Q for $CO_2$, $Q(CO_2)$, values of at least 1 ml/($cm^2$*min*bar) are attained.

An important application of the membranes producible by the process according to the invention is the oxygenation of blood. In these applications, as previously noted, the plasma breakthrough time plays a role, i.e., the time in which the membrane is stable against a breakthrough of blood plasma. It must be emphasized that plasma breakthrough is a considerably more complex process than the mere penetration of a hydrophobic membrane by a hydrophilic liquid. According to accepted opinion, plasma breakthrough is induced by the fact that initially proteins and phospholipids in the blood effect a hydrophilation of the pore system of the membrane, and in a subsequent step a sudden penetration of blood plasma into the hydrophilated pore system takes place. The critical variable for a liquid breakthrough is therefore considered to be the plasma breakthrough time. The membranes of the invention preferably exhibit a plasma breakthrough time of at least 20 hours, and especially preferably a plasma breakthrough time of at least 48 hours.

In general, in the membranes produced according to the invention, the transition from the porous support layer to the separation layer takes place in a narrow region of the membrane wall. In a preferred embodiment of the membrane produced by the process according to the invention, the membrane structure changes abruptly in the transition from the separation layer to the support layer, i.e., the membrane structure changes substantially transition-free and suddenly from the microporous support layer to the separation layer. Membranes with such a structure have, in comparison to membranes with a slow, gradual transition from the separation layer to the support layer, the advantage of higher permeability of the support layer for gases to be transferred, since the support layer is less compact in its area adjacent to the separation layer.

In a preferred embodiment, the membranes produced by the process according to the invention are flat membranes, which preferably have a thickness between 10 and 300 $\mu$m, especially preferably between 30 and 150 $\mu$m. In a likewise preferred embodiment, the membranes produced by the process according to the invention are hollow-fiber membranes. Depending on the embodiment, they can have a separation layer only on their interior surface, i.e. on the surface facing the lumen, or only on their exterior surface, i.e. the surface facing away from the lumen, or on both the interior and exterior surfaces. The separation layer is preferably on the exterior surface. These hollow-fiber membranes preferably have an outside diameter between 30 and 3000 $\mu$m, especially preferably between 50 and 500 $\mu$m. A wall thickness of the hollow-fiber membrane between 5 and 150 $\mu$m is advantageous, and a thickness between 10 and 100 $\mu$m is especially advantageous.

Using the process according to the invention, hollow-fiber membranes with outstanding mechanical properties can readily be produced, in particular with a breaking force of at least 70 cN and an elongation at break of at least 75%, readily enabling processing in subsequent textile processing steps. When using hollow-fiber membranes, it has proven beneficial for the hollow-fiber membranes, with respect to the performance characteristics of membrane modules made therefrom, to be initially formed, for example, by appropriate knitting processes into mats of hollow-fiber membranes substantially parallel to each other, which are then fashioned into appropriate bundles. The associated textile processes impose stringent demands on the mechanical properties of the membranes, in particular on the tensile strength and elongation. These requirements are fulfilled by the membranes produced by the process according to the invention.

Therefore, using the process according to the invention and depending on the embodiment, membranes can on the one hand be employed for gas separation tasks in which, for example, a single gas component is selectively separated from a mixture of at least two gases or a single gas component in a mixture of at least two gases is enriched, or for gas transfer tasks, in which a gas dissolved in a liquid is selectively removed from this liquid, and/or a gas from a mixture of gases is dissolved in a liquid. On the other hand, adjustment of the pore size of the separation layer, for example in a downstream drawing step, also permits production of membranes for nanofiltration, such as for separating low-molecular substances preferably from non-aqueous media, or for ultrafiltration, such as for treating fresh water, sewage, or process water, as well as for applications in the food and dairy industries.

In the examples, the following methods were employed to characterize the membranes obtained:

Qualitative Test of the Tightness of the Membrane Surface

A drop of isopropanol, colored blue to make the effects more noticeable, is placed onto the surface of a membrane sample. The penetration behavior of the isopropanol drop into the membrane surface is observed visually and provides qualitative information concerning the tightness of the membrane surface and thereby the existence of a separation layer with a denser structure. In the case of an open-pored surface, the isopropanol drop penetrates the membrane surface immediately and colors it blue. A tight surface does not allow spontaneous wetting with isopropanol.

Determination of the Plasma Breakthrough Time

To determine the plasma breakthrough time, a phospholipid solution maintained at 37° C. (1.5 g L-α-Phosphatidy-LCholine dissolved in 500 ml physiological saline solution) is directed with a flow of 6 l/(min*2m²) at a pressure of 1.0 bar along one surface of a membrane sample. Air is allowed to flow along the other surface of the membrane sample, the air after exiting the membrane sample being fed through a cooling trap. The weight of the liquid accumulated in the cooling trap is measured as a function of time. The time until the occurrence of a significant increase in the weight, i.e., to the first significant accumulation of liquid in the cooling trap, is designated as the plasma breakthrough time.

Determination of the Volume Porosity

A sample of at least 0.5 g of the membrane to be examined is weighed in a dry state. The membrane sample is then placed for 24 hours into a liquid that wets the membrane but does not cause it to swell, such that the liquid penetrates into all pores. This can be detected visually in that the membrane sample is transformed from an opaque to a glassy, transparent state. The membrane sample is then removed from the liquid, liquid adhering to the sample removed by centrifugation at about 1800 g, and the mass of the thus pretreated wet, i.e., liquid-filled, membrane, determined.

The volume porosity in % is determined according to the following formula:

$$\text{Volume porosity } [\%] = 100 \cdot \frac{(m_{wet} - m_{dry})/\rho_{liq.}}{(m_{wet} - m_{dry})/\rho_{liq.} + m_{dry}/\rho_{polymer}}$$

where $m_{dry}$=weight of the dry membrane sample
$m_{wet}$=weight of the wet, liquid-filled membrane sample
$\rho_{liq.}$=density of the liquid used
$\rho_{polymer}$=density of the membrane polymer Determination of the Gas Flow To determine the gas flow rates, one of the sides of a membrane sample is subjected to the gas to be measured, under a constant test pressure of 2 bar. In the case of hollow-fiber membranes, the gas is introduced into the lumen of the hollow-fiber membrane for this purpose. The volume stream of the gas penetrating through the wall of the membrane sample is determined and standardized with respect to the test pressure and area of the membrane sample penetrated by the gas stream. For hollow-fiber membranes, the interior surface of the membrane enclosing the lumen is employed for this.

EXAMPLE 1

25% by weight poly(4-methyl-1-pentene) (TPX DX845) was dissolved homogeneously at approx. 255° C. in 75% by weight of a mixture of 62% by weight dioctyl phthalate and 38% by weight glycerin triacetate as a solvent system. The homogeneous solution, tempered to 255° C., was applied with a doctor blade to a glass plate maintained at ambient temperature, whereby the distance between the doctor blade and glass plate was 250 μm. After cooling and the resulting phase separation, a porous polymer film was obtained, which was subsequently extracted with isopropanol and then dried at ambient temperature.

The flat membrane obtained had, on the surface facing the glass side during production, a dense separation layer without pores (FIG. 1). Below this dense layer was a sponge-like, open-pored, microporous support layer (FIG. 2). The qualitative test for tightness of the surface using isopropanol indicated that the dense side of the membrane of this example was not spontaneously wetted.

EXAMPLE 2

The polymer solution according to example 1 was used to produce a hollow-fiber membrane. For this purpose, the homogeneous solution was extruded through a hollow-fiber die having an annular gap of 350 μm with an outside diameter of 1.2 mm and, following an air gap of 10 cm, led through glycerin triacetate as a cooling medium. The cooling medium was maintained at ambient temperature.

Figure 4:
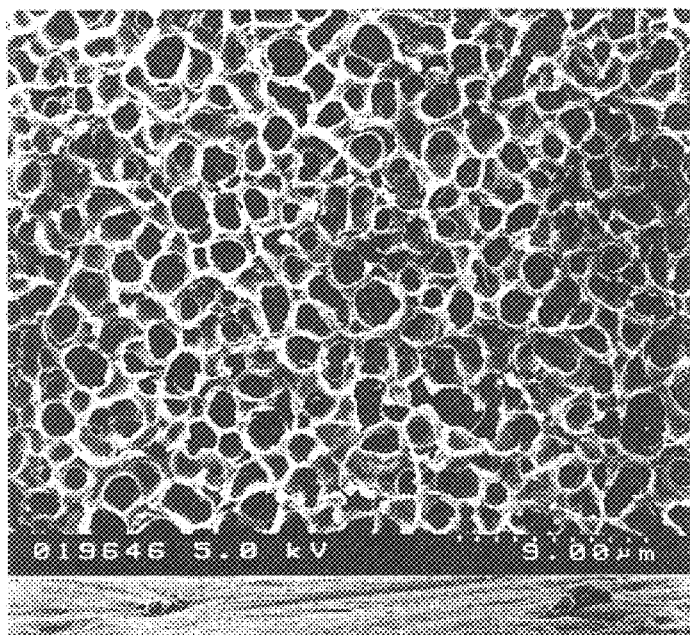
FIG. 4 shows an SEM image of the surface of fracture perpendicular to the longitudinal axis of a hollow-fiber membrane according to example 2 in the wall interior at 3000×magnification.

A hollow-fiber membrane was obtained for which the scanning electron microscope image indicated a dense separation layer (FIG. 3) on the outside and a sponge-like, open-pored, microporous support structure (FIG. 4) in the interior of the wall. The dense outside of the membrane was not spontaneously wettable with isopropanol.

EXAMPLE 3

The procedure as in example 1 was followed, whereby a solution of 25% by weight poly(4-methyl-1-pentene) in 75% by weight of a mixture of 93% by weight dioctyl phthalate and 7% by weight glycerin monoacetate as a solvent system was used.

The homogeneous solution, tempered to 255° C., was applied with a doctor blade to a glass plate maintained at ambient temperature, whereby the distance between the doctor blade and glass plate was 250 μm. After cooling and the resulting phase separation, a porous polymer film was obtained, which was subsequently extracted with isopropanol and then dried at ambient temperature.

Figure 5:
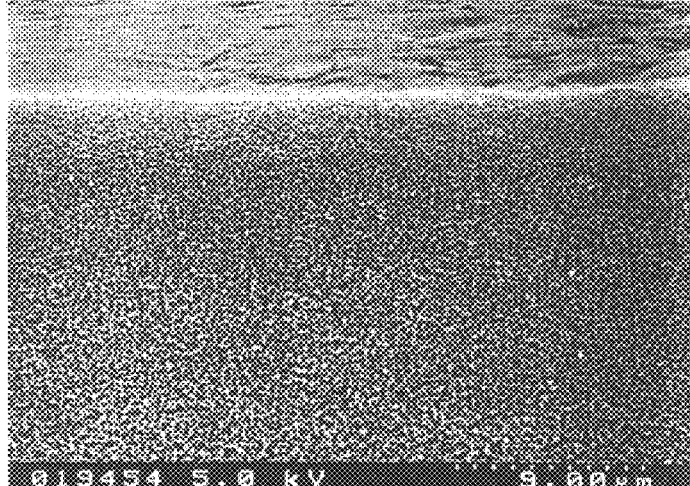
FIG. 5 shows an SEM image of a membrane according to example 3 at 3000×magnification; fracture edge of the membrane between the membrane wall and the surface that was facing the glass side during membrane production.
Figure 6:
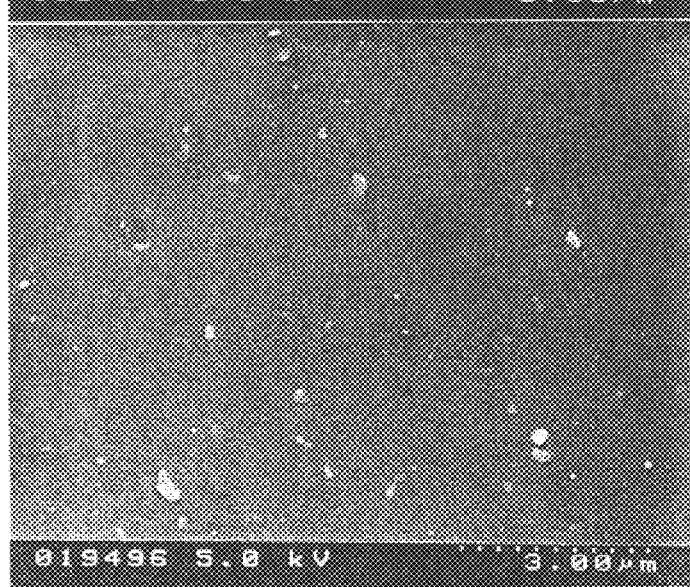
FIG. 6 shows an SEM image of a membrane according to example 3 at 9000×magnification; membrane surface that was facing the glass side during membrane production.

The result was a flat membrane that, on the surface facing the glass side during production, had a dense separation layer without pores (FIGS. 5 and 6). The adjacent sponge-like, open-pored, microporous support layer was open-pored on the side facing away from the glass plate during production. The dense side was not spontaneously wettable with isopropanol.

EXAMPLE 4

Poly(4-methyl-1-pentene) was melted stepwise in an extruder at increasing temperatures ranging from 265° C. to 300° C. and fed continuously to a dynamic mixer using a gear pump. The solvent system, consisting of 70% by weight dioctyl phthalate and 30% by weight glycerin triacetate, was also fed to the mixer via a dosing pump, in which the polymer and solvent system were processed together at a temperature of 290° C. to form a homogeneous solution with a polymer concentration of 35% by weight and a solvent-system concentration of 65% by weight. This solution was fed to a hollow-fiber die with an outside diameter of 1.2 mm and an annular gap of 350 μm and extruded above the phase separation temperature at 245° C. to form a hollow fiber. Nitrogen was used as the interior filler. After an air section of 25 mm, the hollow fiber passed through an approx. 1 m long spinning tube, through which glycerin triacetate, tempered to 18° C., flowed as a cooling medium. The hollow fiber, solidified as a result of the cooling process in the spinning tube, was drawn off from the spinning tube at a rate of 72 m/min, wound onto a spool, subsequently extracted with isopropanol, and then dried at 120° C.

Figures 7, 8, 9:
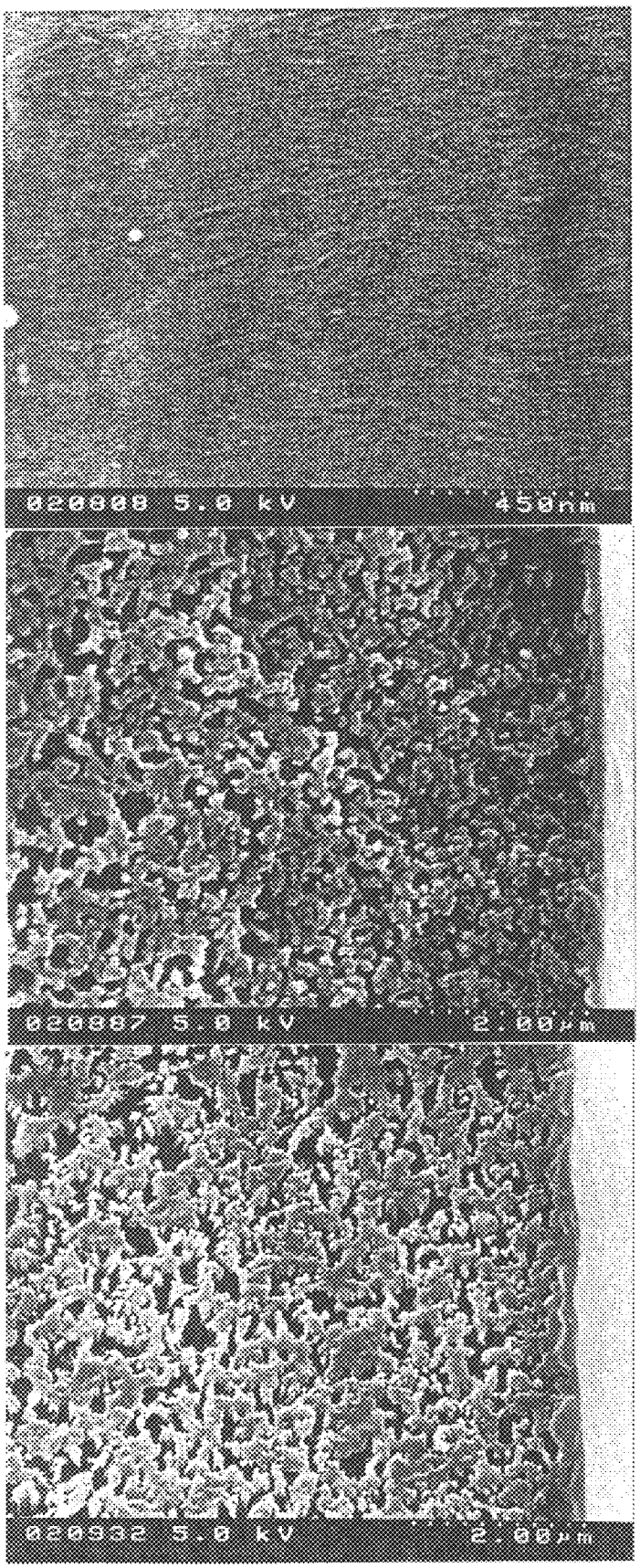
FIG. 7 shows an SEM image of the exterior surface of a hollow-fiber membrane according to example 4 at 60000× magnification.
FIG. 8 shows an SEM image of the surface of fracture perpendicular to the longitudinal axis of a hollow-fiber membrane according to example 4, in the vicinity of its outer side, at 13500×magnification.
FIG. 9 shows an SEM image of the surface of fracture perpendicular to the longitudinal axis of a hollow-fiber membrane according to example 5, in the vicinity of its outer side, at 13500×magnification.

A hollow-fiber membrane was obtained with an outside diameter of 412 μm and a wall thickness of 93 μm, the exterior surface of which indicated no pores according to SEM examination, even at a magnification of 60000× (FIG. 7). In the fracture image of a surface of fracture perpendicular to the longitudinal axis of the hollow-fiber membrane, the sponge-like, open-pored, microporous support layer is evident, which is covered by the approx. 0.2 μm thick separation layer (FIG. 8). For the membrane according to this example, a volume porosity of 57% and a $CO_2$ flow of 2.82 ml/($cm^2$*min*bar) were determined. The membrane exhibited a plasma breakthrough time of more than 72 hours. After this time, the test was discontinued.

EXAMPLE 5

Polypropylene (Vestolen® P9000) was melted in an extruder stepwise at increasing temperatures ranging from 210° C. to 240° C. and fed continuously to a dynamic mixer using a gear pump. The solvent system, consisting of 75% by weight soybean oil and 25% by weight castor oil, was also fed, via a dosing pump, to the mixer, in which the polymer and solvent system were processed together for 6 min. at a temperature of 240° C. to form a homogeneous solution with a polymer concentration of 38% by weight and a solvent-system concentration of 62% by weight. This solution was fed to a hollow-fiber die with an outside diameter of 1.2 mm and annular gap of 350 μm and extruded above the phase separation temperature at 232° C. to form a hollow fiber. Nitrogen was used as the interior filler. After an air section of 5 mm, the hollow fiber passed through an approx. 1 m long spinning tube, through which glycerin triacetate, tempered to 18° C., flowed as a cooling medium. The hollow fiber, solidified as a result of the cooling process in the spinning tube, was drawn off from the spinning tube at a rate of 72 m/min, wound onto a spool, subsequently extracted with isopropanol, and then dried at 120° C.

The hollow-fiber membrane obtained indicated, in the fracture image of a surface of fracture perpendicular to the longitudinal axis of the hollow-fiber membrane, a sponge-like, open-pored, microporous support structure, which was covered on the outside of the membrane by an approx. 0.3 μm thick separation layer (FIG. 9). On the basis of SEM examination at 60000×magnification, individual pores with a size up to 0.1 μm could be detected on the membrane's exterior surface. The membrane according to this example had an outside diameter of 393 μm and a wall thickness of 80 μm. It had a volume porosity of greater than 55% by volume and a $CO_2$ flow of 74.5 ml/($cm^2$*min*bar).

EXAMPLE 6

The procedure as in example 4 was followed, whereby a mixture of 97% by weight dibutyl phthalate and 3% by weight glycerin triacetate was used as the solvent system. The die was heated to 240° C., and the air gap was 20 mm.

A hollow-fiber membrane was obtained with an outside diameter of 413 μm and a wall thickness of 88 μm. In the SEM examination, no pores were evident in the exterior surface even at a magnification of 60000×. In the fracture image of a surface of fracture perpendicular to the longitudinal axis of the hollow-fiber membrane, a sponge-like, open-pored, microporous support structure was evident, which was covered by the approx. 0.3 μm thick separation layer. For the membrane according to this example, a volume porosity of 57% and a $CO_2$ flow of 4.90 ml/($cm^2$*min*bar) were determined. The membrane exhibited a plasma breakthrough time of more than 72 hours. After this time, the test was discontinued.

Comparative Example 1

The solution used in example 3 of poly(4-methyl-1-pentene) in a solvent system comprising dioctyl phthalate and glycerin monoacetate was extruded through a hollow-fiber die with an annular-gap outside diameter of 1.2 mm and an annular gap of 350 μm and, after an air gap of 10 cm, led through dioctyl phthalate as a cooling medium. The cooling medium was maintained at ambient temperature. Dioctyl phthalate is itself a solvent for poly(4-methyl-1-pentene).

Figure 10:
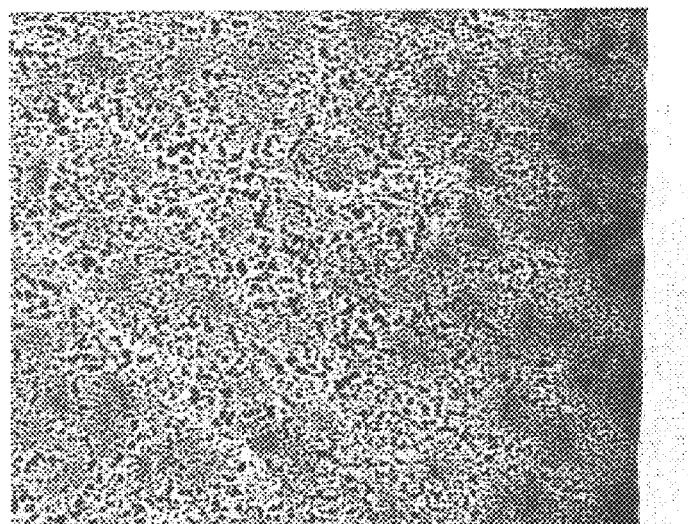
FIG. 10 shows an SEM image of the surface of fracture perpendicular to the longitudinal axis of a hollow-fiber membrane according to comparative example 1, in the vicinity of its outer side, at 3000×magnification.

The hollow-fiber membrane obtained exhibited a large number of fine pores on its exterior surface. In the fracture image of a surface of fracture perpendicular to the longitudinal axis of the hollow-fiber membrane, no separation layer was detectable; porous regions extend up to the surface (FIG. 10). The exterior surface was spontaneously wettable with isopropanol.

Comparative Example 2

A hollow-fiber membrane made from polypropylene was produced as in example 5. In contrast to example 5, however, soybean oil tempered to 45° C. was used as the cooling medium. Soybean oil is a weak solvent with respect to polypropylene.

Figure 11:
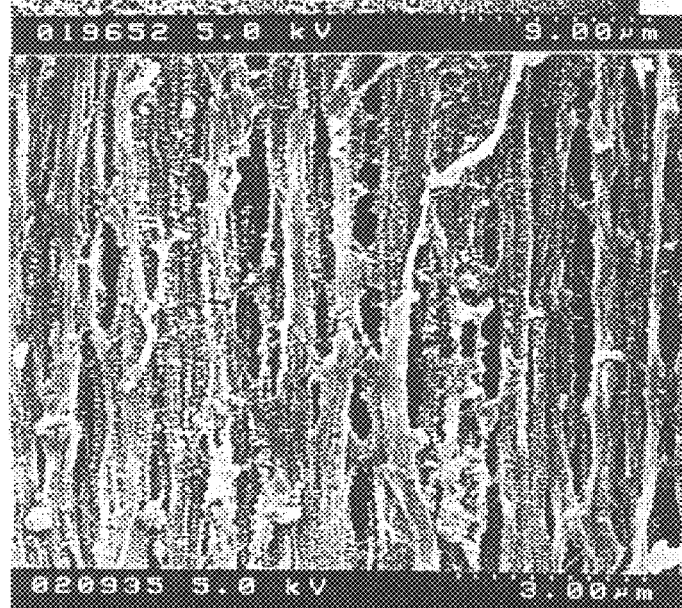
FIG. 11 shows an SEM image of the exterior surface of a hollow-fiber membrane according to comparative example 2 at 9000×magnification.
Figure 12:
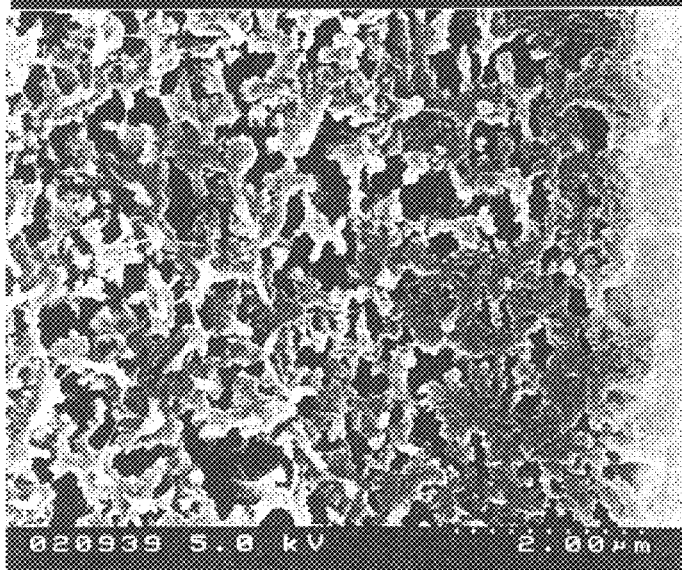
FIG. 12 shows an SEM image of the surface of fracture perpendicular to the longitudinal axis of a hollow-fiber membrane according to comparative example 2, in the vicinity of its outer side, at 13500×magnification.

A hollow-fiber membrane was obtained with an outside diameter of 414 μm and a wall thickness of 90 μm, the exterior surface of which had a pronounced open-pored structure according to the SEM images (FIG. 11). In the fracture image of a surface of fracture perpendicular to the longitudinal axis of the hollow-fiber membrane, no separation layer was evident on the exterior surface; the porous structure extended up to the surface (FIG. 12). The membrane according to this example had a $CO_2$ flow of 204 ml/($cm^2$*min*bar) and a plasma breakthrough time of only 4 hours. While such a membrane might indeed be suitable for standard blood oxygenation applications, it is not suitable for extended-duration oxygenation.

Comparative Examples 3 and 4

25% by weight poly(4-methyl-1-pentene) was dissolved at 255° C. in 75% by weight of a mixture of 90% by weight isopropyl myristate and 10% by weight glycerin monoacetate, i.e., in accordance with the definition of the present invention, a mixture of a strong solvent and a strong non-solvent. The homogeneous and clear solution, tempered to 255° C., was applied with a doctor blade to a glass plate maintained at ambient temperature, whereby the distance between the doctor blade and glass plate was set to 250 µm. The cooled, porous polymer film was extracted with isopropanol and then dried at ambient temperature.

Figures 13, 14, 15:
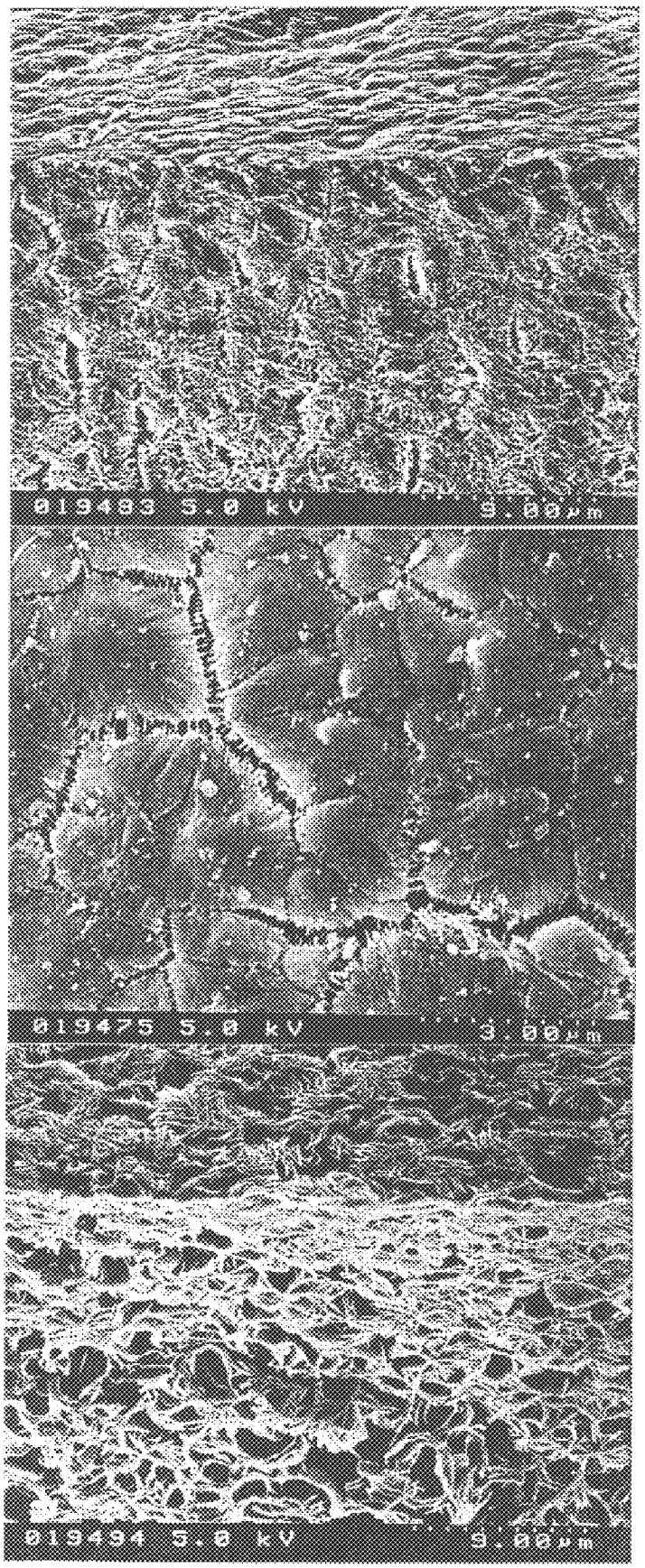
FIG. 13 shows an SEM image of a membrane according to comparative example 3 at 3000×magnification; fracture edge of the membrane between the membrane wall and the surface that was facing the glass side during membrane production.
FIG. 14 shows an SEM image of a membrane according to comparative example 3 at 9000×magnification, showing the membrane surface that was facing the glass side during membrane production.
FIG. 15 shows an SEM image of a membrane according to comparative example 4 at 3000×magnification; fracture edge of the membrane between the membrane wall and the surface that was facing the glass side during membrane production.

The resulting flat membrane had a pronounced compact and in part particle structure over its thickness, with intermediate pore channels (FIG. 13) that extended up to the surface facing the glass side during production and there formed pores in part exceeding 0.1 µm in size (FIG. 14). No separation layer was evident.

When applying the polymer solution with a doctor blade to a glass plate heated to 100° C., structures that were more open-pored resulted in the area of the membrane wall. However, a separation layer is also not evident in the SEM image of the fracture edge in FIG. 15, whereby the SEM image depicts the fracture edge between the membrane wall and the surface that was facing the glass side during membrane production. This surface is clearly open-pored, with pores in the micrometer range.

What is claimed is:

1. Process for producing an integrally asymmetrical hydrophobic membrane having a sponge-like, open-pored, microporous support structure and a separation layer with a denser structure compared to the support structure, the process comprising:
   a) preparing a homogeneous solution of 20–90% by weight of a polymer component comprising at least one polyolefin in 80–10% by weight of a solvent system containing a compound A and a compound B that are liquid and miscible with each other at a dissolving temperature, wherein the solution of the polymer component, compound A and compound B has a critical demixing temperature and a solidification temperature and has a miscibility gap in a liquid state of aggregation below the critical demixing temperature, wherein compound A comprises a solvent for the polymer component, and compound B raises a demixing temperature of a solution consisting of the polymer component and compound A,
   b) rendering the solution to form a shaped object, with a first and a second surface, in a die having a temperature above the critical demixing temperature,
   c) cooling the shaped object using a cooling medium, tempered to a cooling temperature below the solidification temperature, at such a rate that a thermodynamic non-equilibrium liquid-liquid phase separation into a high-polymer-content phase and a low-polymer content phase takes place and solidification of the high-polymer-content phase subsequently occurs when the temperature falls below the solidification temperature, and
   d) optionally removing compound A and compound B from the shaped object, wherein compound A is a weak solvent for the polymer component, for which a demixing temperature of a solution of 25% by weight of the polymer component in this solvent is less than 10% below a melting point of pure polymer component, wherein compound B is a non-solvent for the polymer component that does not dissolve the polymer component to form a homogeneous solution when heated to a boiling point of the non-solvent, and wherein, for cooling, the shaped object is brought into contact with a solid or liquid cooling medium that does not dissolve or react chemically with the polymer component at temperatures up to the die temperature.

2. Process according to claim 1, wherein compound B is a weak non-solvent for the polymer component.

3. Process according to claim 1, wherein the cooling medium is a liquid that is a non-solvent for the polymer component.

4. Process according to claim 3, wherein the cooling medium contains compound B.

5. Process according to claim 3, wherein the cooling medium is a liquid that is a strong non-solvent for the polymer component.

6. Process according to claim 1, wherein a cooling medium is used that is a homogeneous, single-phase liquid at the cooling temperature.

7. Process according to claim 1, wherein the cooling medium has a temperature that is at least 100° C. below the critical demixing temperature.

8. Process according to claim 1, wherein at least one of the first surface and the second surface of the shaped object, after leaving the die and prior to its cooling, is subjected to an atmosphere promoting evaporation of compound A and/or compound B.

9. Process according to claim 1, wherein 30–60% by weight of the polymer component is dissolved in 70–40% by weight of the solvent system.

10. Process according to claim 1, wherein the at least one polyolefin consists of carbon and hydrogen.

11. Process according to claim 10, wherein the at least one polyolefin is a poly(4-methyl-1-pentene).

12. Process according to claim 10, wherein the at least one polyolefin is a polypropylene.

13. Process according to claim 10, wherein the at least one polyolefin is a mixture of a poly(4-methyl-1-pentene) and a polypropylene.

14. Process according to claim 10, wherein the at least one polyolefin is a polyethylene.

15. Process according to claim 11, wherein compound A comprises palm nut oil, dibutyl phthalate, dioctyl phthalate, butyl stearate, or a mixture thereof.

16. Process according to claim 11, wherein compound B comprises glycerin triacetate, diethyl phthalate, castor oil, N,N-bis(2-hydroxyethyl)tallow amine, soybean oil, glycerin dictate, glycerin monoacetate or a mixture thereof.

17. Process according to claim 12, wherein compound A comprises N,N-bis(2-hydroxyethyl)tallow amine, dioctyl phthalate, soybean oil, palm nut oil, or a mixture thereof.

18. Process according to claim 12, wherein compound B comprises dibutyl phthalate, diethyl phthalate, glycerin triacetate, castor oil, or a mixture thereof.

19. Process according to claim 14, wherein compound A comprises soybean oil, palm nut oil, isopropyl myristate, or a mixture thereof.

20. Process according to claim 14, wherein compound B comprises castor oil.

21. Process according to claim 1, compound B comprises 1 to 45% by weight of the solvent system.

22. Process according to claim 1, wherein the membrane is a hollow-fiber membrane.

23. Process for oxygenating blood, comprising transferring oxygen from a first side of the membrane of claim 1 through the membrane to blood on a second side of the membrane.

* * * * *

UNITED STATES PATENT AND TRADEMARK OFFICE
CERTIFICATE OF CORRECTION

PATENT NO. : 6,375,876 B1
DATED : April 23, 2002
INVENTOR(S) : Erich Kessler, Thomas Batzilla, Friedbert Wechs and Frank Wiese It is certified that error appears in the above-identified patent and that said Letters Patent is hereby corrected as shown below:

<u>Title page,</u>
Item [56], References Cited, U.S. PATENT DOCUMENTS, change "Joseflack" to -- Josefiak --; and "JJoseflack" to -- Josefiak --.

Item [56], References Cited, FOREIGN PATENT DOCUMENTS, change "DE 2833493 1/1980" to -- DE 2833493 2/1980 --.

Item [56], References Cited, OTHER PUBLICATIONS, change both occurrences of "pgs." to -- pp. --.

Item [56], References Cited, OTHER PUBLICATIONS, delete third and fourth publications listings <u>Column 21,</u>
Line 3, insert -- wherein -- before "compound".

Signed and Sealed this

First Day of October, 2002

Attest:

Attesting Officer

JAMES E. ROGAN
*Director of the United States Patent and Trademark Office*